Jan. 28, 1930.  A. BROWN  1,744,746
TENSIONING DEVICE FOR DRIVING BELTS
Filed April 7, 1927

Witness
Jas. J. Maloney.

Inventor
Arthur Brown
by Van Everen Fish
Hildreth & Cary
Attys

Patented Jan. 28, 1930

1,744,746

UNITED STATES PATENT OFFICE

ARTHUR BROWN, OF CRANSTON, RHODE ISLAND, ASSIGNOR TO BROWN AND SHARPE MANUFACTURING COMPANY, A CORPORATION OF RHODE ISLAND

TENSIONING DEVICE FOR DRIVING BELTS

Application filed April 7, 1927. Serial No. 181,703.

The invention relates to tensioning devices for driving belts.

The object of the invention is to provide a novel and improved spring tensioning device for a driving belt which may be readily adjusted by the operator to secure the desired tension on the belt and the adjustment of which will indicate the amount of the tension.

A further object of the invention is to provide in a manually adjustable tensioning device for a belt, means for limiting the amount to which the belt may be tightened by the operator to a predetermined maximum.

With these objects in view, the several features of the invention consist in the devices, combinations and arrangement of parts hereinafter described and claimed which, together with the advantages to be obtained thereby, will be readily understood by those skilled in the art from the following description taken in connection with the accompanying drawings.

Figure 1:
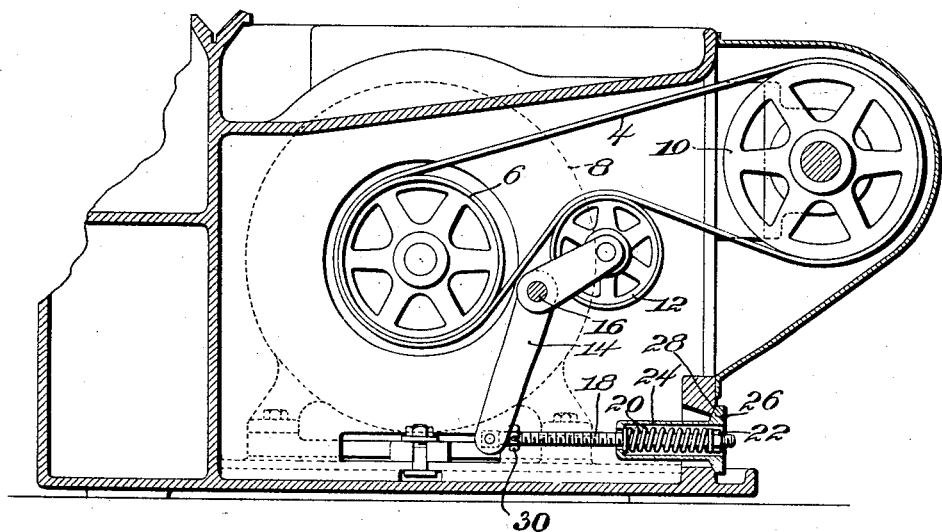
Figure 2:
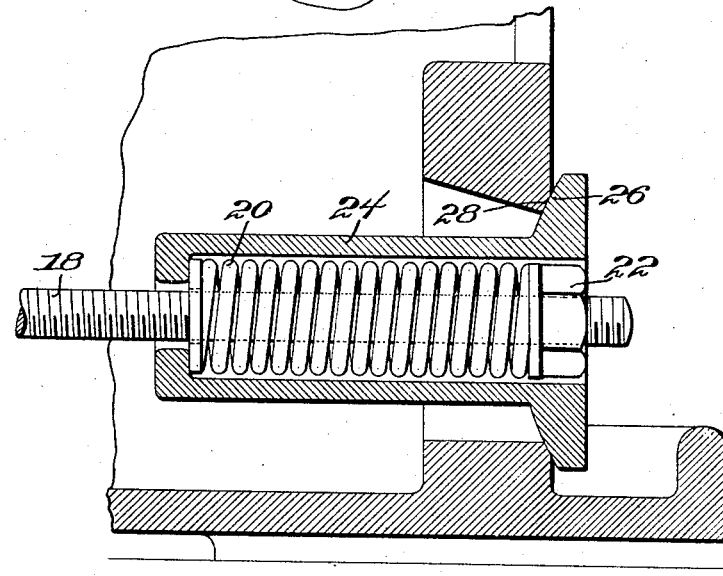

In the drawings, Fig. 1 is an elevation of one embodiment of the invention applied to a grinding machine; and Fig. 2 is a sectional view on a large scale of a portion of the tensioning device illustrated in Fig. 1. Only so much of the grinding machine is illustrated as is necessary to show the connection of the invention therewith.

In carrying out the invention, a tensioning device for a driving belt has been provided comprising an idler pulley mounted on a movable carrier and a spring to hold the pulley yieldingly against the belt. It is desirable to maintain the belt at a constant tension which is sufficient to prevent slippage and consequent loss of power, and which at the same time is not so great as to cause unnecessary strain and wear on the belt. To this end the present invention contemplates the provision of means whereby the operator can readily adjust the spring tension to a predetermined value, and also for limiting the amount to which the tension may be increased to a predetermined maximum, thus obviating any danger of overloading the belt by an inexperienced or careless operator.

The spring is inserted between a fixed abutment and an adjustable nut which is directly connected with the movable carrier so that the amount of the tension upon the belt will depend upon the length to which the spring expands. As the belt loosens the tendency of the spring is to expand and move the adjustable nut away from the abutment to take up on the belt, but at a slightly lower tension, due to the more extended position of the spring. The required adjustment to tighten the belt is made by the operator by taking up on the adjustable nut to compress the spring. In order more readily to measure the tension of the belt and also to prevent the tightening of the spring beyond the desirable maximum limits a stationary sleeve surrounds the spring and prevents the tightening of the spring beyond a point which will bring the adjustable nut flush with the end of the sleeve.

Referring more specifically to the drawings, a driving belt is indicated at 4 running on the pulley 6 secured to the shaft of the motor 8 and the pulley 10 secured to the main driving shaft of the machine. The belt is maintained at the required tension by means of an idler pulley 12 mounted on one end of the lever 14 which is pivoted at 16 to the machine frame. The lower end of the lever 14 is secured to one end of a rod 18 which is arranged to move axially in one direction to increase the tension on the belt and in the other direction to relieve the tension. Surrounding the rod 18 is a compression spring 20 which is inserted between an adjusting nut 22 on the rod and a shoulder on the sleeve 24 which has at its other end an enlarged portion 26 to bear against a corresponding bearing 28 formed in the machine frame. As the belt loosens up with continued service, the spring 20 will tend to expand, forcing the rod 18 and the adjusting nut 22 outwardly to the right as viewed in Fig. 1 to take up the belt, but at a somewhat lower tension due to the relatively extended position of the spring.

The required adjustment to bring the belt up to the proper degree of tightness is made by the operator by screwing up the adjusting nut to increase the compression of the spring 20. The adjusting nut 22 is adapted to fit within the sleeve 24 so that when the operator has tightened up the nut as far as he can, the nut will be approximately flush with the end of the sleeve. It is clear that the amount of the tension exerted by the spring is now measured by the length of the surrounding sleeve 24, while at the same time, free play is permitted to the spring to adjust itself to variations in the running conditions of the mechanism. The length of the sleeve and the strength of the spring used are carefully adjusted so that the tension exerted on the belt will not be excessive for the maximum limit to which the spring can be tightened manually by the operator.

For convenience in assembling the belt and in replacing broken belts, means are provided for moving and holding the idler pulley 12 away from the belt against the tension of the spring 20. For this purpose, a nut indicated at 30 is threaded on the rod 18 and may be tightened up against the end of the sleeve 24 causing the rod 18 to be moved to the left as viewed in Fig. 1 against the pressure of the spring 20, thus relieving the tension on the belt. After the belt has been assembled, the nut is backed along the rod 18 to the position shown in Fig. 1 so that it will not interfere with the proper functioning of the spring during the operation of the machine.

One form of the invention having been described and illustrated, and the advantages to be obtained therefrom indicated, what is claimed is:

1. The combination with a driving belt of an idler pulley, a movable carrier for the pulley, a rod secured to the carrier, a stationary sleeve surrounding the rod, an adjusting nut on the rod adapted to fit within the sleeve and a compression spring coiled about the shaft between the adjusting nut and a shoulder on the opposite end of the sleeve.

2. The combination with a driving belt of a tensioning device therefor comprising an idler pulley, a movable carrier for the pulley, a rod secured to the carrier, a sleeve surrounding the rod and having a fixed bearing, an adjusting nut on the rod, and a compression spring coiled about the shaft within the sleeve and inserted between a shoulder on the sleeve and the adjusting nut.

3. The combination with a driving belt of an idler pulley, a movable carrier for the pulley, a fixed abutment, an adjustable nut movable with the carrier, a spring inserted between the fixed abutment and the nut for exerting a tension on the belt, and means fixed with relation to the carrier for limiting the adjustment of the nut towards the fixed abutment to establish a maximum resilient spring pressure regardless of the position of the belt.

4. The combination with a driving belt of an idler pulley, a movable carrier for the pulley, a fixed abutment, an adjustable nut movable with the carrier, a spring inserted between the fixed abutment and the nut for exerting a tension on the belt and a sleeve fixed with relation to the carrier surrounding the spring for limiting the amount to which the belt may be tightened.

5. The combination with a driving belt of a tensioning device therefor comprising an idler pulley, a movable carrier for the pulley, a rod secured to the carrier, a sleeve surrounding the rod and having a fixed bearing, an adjusting nut on the rod, a compression spring coiled about the shaft within the sleeve and inserted between a shoulder on the sleeve and the adjusting nut, and means for moving the rod relatively to the sleeve to compress the spring and release the tension on the belt.

6. The combination with a driving belt of an idler pulley, a movable carrier for the pulley, a rod secured to the carrier, a fixed abutment, an adjustable nut on the rod, a spring inserted between the abutment and the nut for exerting a tension on the belt, and a nut threaded to the rod adapted to engage the fixed abutment to move the rod relatively to the abutment to release the tension on the belt.

7. The combination with a driving belt of an idler pulley, a movable carrier for the pulley, a rod secured to the carrier, a stationary sleeve surrounding the rod, an adjusting nut on the rod adapted to fit within the sleeve, a compression spring coiled about the shaft between the adjusting nut and a shoulder on the opposite end of the sleeve, and a nut threaded to the rod adapted to engage the sleeve to move the rod relatively to the abutment to release the tension on the belt.

8. The combination with a driving belt of an idler pulley, a movable carrier for the pulley, a spring acting on the carrier to tension the belt, a nut for tightening the spring movable with the carrier, and a guard fixed with relation to the carrier to prevent the nut from being turned up to tighten the spring beyond a predetermined point within the limits of the spring.

9. The combination with a driving belt of an idler pulley, a movable carrier for the pulley, a spring acting on the carrier to tension the belt, a spring adjusting device movable with the carrier, and a guard fixed with relation to the carrier for limiting the adjustment to a predetermined maximum resilient spring pressure on the belt.

In testimony whereof I have signed my name to this specification.

ARTHUR BROWN.